May 18, 1937.                    H. SMITH                    2,080,936
                    DOOR FOR AUTOMOBILES AND THE LIKE
                            Filed July 22, 1935
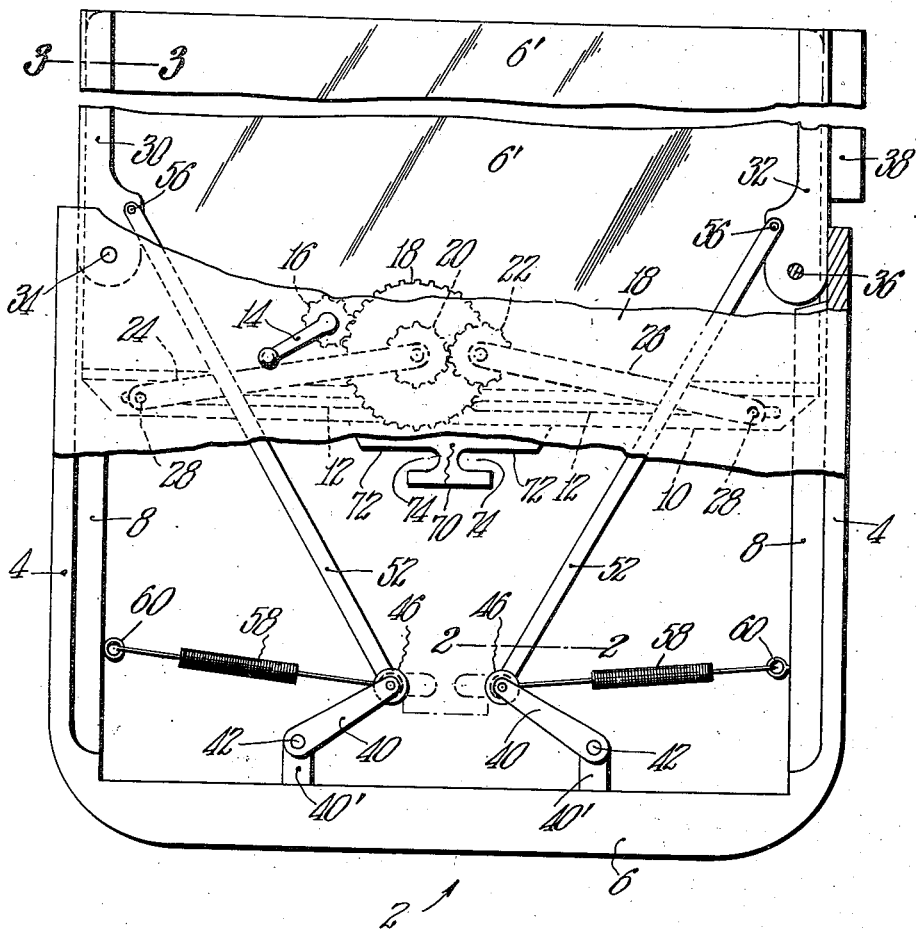
INVENTOR.
Hinsdale Smith
BY Walter C. Ross,
ATTORNEY.

Patented May 18, 1937

2,080,936

UNITED STATES PATENT OFFICE 2,080,936

DOOR FOR AUTOMOBILES AND THE LIKE

Hinsdale Smith, Springfield, Mass., assignor to Hinsdale Smith, Jr., New York, N. Y.

Application July 22, 1935, Serial No. 32,499

9 Claims. (Cl. 296—48)

This invention relates to improvements in bodies for vehicles of all kinds and is directed more particularly to the provision of improvements in doors for convertible bodies for automobiles.

The principal objects of the invention are directed to the provision of novel means associated with the sliding window of an automobile door whereby a pivoted guide or guides for the window are positively actuated between window-guiding and non-guiding positions by movement of the window. In this way a guide or guides are moved to guiding position by the window as it is elevated from its lower position in the door to a raised position and likewise when the window is lowered to its position in the door the guides are moved thereby to their unguiding position. Thus the guide or guides are automatically moved between guiding and non-guiding positions accordingly as it is desired to position the window in lower or some elevated position.

Various other novel features and advantages of the invention will be hereinafter more fully referred to in connection with the accompanying description of the preferred form thereof, reference being had to the drawing wherein:

Fig. 1 is an elevational view of an automobile door having the novel features of the invention associated therewith, parts being broken away for clearness;

Fig. 2 is a sectional plan view on the line 2—2 of Fig. 1; and

Fig. 3 is a sectional plan view on the line 3—3 of Fig. 1.

Referring now to the drawing more in detail, the invention will be fully described.

2 represents an automobile door, the drawing showing the door when viewed from the inside thereof. As usual, the door includes side frames 4 and a bottom or lower frame 6 which are secured together to form a rigid structure.

A window 6' is slidable up and down in guides 8 associated with the door in the usual manner. In Fig. 1 the window 6' is shown in a raised or elevated position.

A bottom member 10 is associated with the lower edge of the window 6' and has slots such as 12 therein. A rotatable operating handle or lever 14 has a gear 16 disposed rearwardly of a covering 18 usually associated with the door frame and this gear 16 meshes with a gear 18' as shown. A gear 20 is rotatable with the gear 18' and this is in mesh with a gear 22. Fixed to the gears 20 and 22 and rotatable therewith are arms 24 and 26 which have pins or rollers 28 in their outer ends that are disposed in the slots 12.

As the handle 14 is rotated in one direction or the other, the gears and consequently the arms 24 and 26 are moved in one direction or the other to effect raising or lowering movement of the window 6'. The window operating mechanism described is of typical form but other means may be employed for raising and lowering the window. It will be understood that the features of this invention are concerned more particularly with the guide and operating means therefor than with the operating means for the window, the operating means for the guide being actuated by movements of the window according to this invention.

Guides such as 30 and 32 are pivoted to the door at 34 and 36 for swinging movements between the guiding position shown in Fig. 1 and horizontal, non-guiding positions. These guides are preferably channel-shaped as shown in Fig. 3 and may carry felt bearing strips 33 in which the edges of the side window 6' slide. In some cases one guide at one side of the door may suffice. Either one or both of the guides may carry a yieldable strip such as 38 which may be of rubber or the like for coacting with some adjacent part of an adjacent door, post or the like of an automobile with which the structure is to be employed.

Levers 40 are pivoted at 42 on brackets 40' associated with the door frame at the lower side thereof and these may have in their forward ends rollers 46. These rollers 46 are preferably provided with flanges such as 48 at either side of a central portion 50.

Links or rods 52 have their lower ends pivoted on roller studs 54 associated with the levers 40 and their upper ends are pivoted at 56 to the guides 30 and 32. Tension springs 58 have their outer ends retained by hooks or eyes 60 associated with the door frames while their inner ends are connected to the studs 54. These springs tend to urge the levers 40 in one direction such as upwardly and tend to urge the guides 30 and 32 into their upstanding guiding position shown in Fig. 1 and function to eliminate rattling of the parts.

An actuating member 70 is associated with the lower edge of the window 6' and it carries cam surfaces such as 72 associated with open ended slots indicated by 74. As the window in being lowered approaches its lower position, the cam surfaces 72 abut the parts 50 of the rollers 46 on the levers 40 so that a continuous lowering movement of the windows causes the rollers to enter the slots 74 whereby the levers are swung downwardly. Through the rods or links 52 the levers 40 swing the guides 30 and 32 downwardly from the window guiding position shown to their non-guiding position.

In the position of the parts shown in Fig. 1 the window is in an upper position with the guides 30 and 32 in their window guiding position. As the window is lowered from this position by rotation of the crank 14 the member 70 approaches the guide operating levers 40. Before the window reaches its lowermost position, the cam surfaces 72 of the member 70 bring up against the reduced portions 50 of the rolls 46 so that the continued lowering of the window causes the levers 40 to be swung downwardly, the rolls entering the slots 74.

As the levers 40 swing downwardly, the guides 32 and 33 are swung inwardly and downwardly from their window guiding positions and as stated the springs 58 tend to urge the levers 40 upwardly and at the same time serve to take up lost motion in the parts and thereby prevent rattling of the parts.

When the window is in its lowermost position, the guides are in substantially horizontal position and to elevate the window, the crank 14 is rotated. The initial raising movement of the window causes or allows the levers 40 to be elevated so that the guides 30 and 32 are elevated to their vertical window guiding position. In this vertical position the window edges are received in the guides and may be elevated to its uppermost or any intermediate position. It will be understood that the parts are so arranged that the guides are elevated to guiding position to receive the window and are lowered as the window approaches its lowermost position.

From the foregoing it will be observed that a guide or guides for the window which are pivoted for swinging movements between window-guiding and non-guiding position are operated by means positively actuated by the raising and lowering movements of the window or actuating mechanism. This obviates the necessity of mechanism for moving a guide or guides between non-guiding and guiding positions. Thus automatically the guides are moved to and out of position accordingly as the window is manipulated.

While I have described the invention in great detail and with respect to a preferred form thereof, it is not desired to be limited thereto since many changes and modifications may be made therein without departing from the spirit and scope of the invention. What it is desired to claim and secure by Letters Patent of the United States is:

1. The combination of a door having a window slidable up and down therein and operating means therefor with window guiding means and operating means therefor comprising, a channelled guide pivoted to said door for swinging movements between guiding and non-guiding positions, an operating lever pivoted to said door for swinging movements, connections between the non-pivoted end of said lever and guide whereby the latter is actuated by the former, an actuating member associated with said window having a cam surface and slot adapted to act on and receive the end of said lever as the window slides in opposite directions thereby to positively operate the guide by movements of the window.

2. The combination of a door having a window slidable up and down therein and operating means therefor with window guiding means and operating means therefor comprising, channelled guides pivoted to said door for swinging movements between guiding and non-guiding positions, operating levers pivoted to said door for swinging movements, connections between the non-pivoted ends of said levers and guides whereby the latter are actuated by the former, an actuating member associated with said window having a cam surface and slot adapted to act on and receive the ends of said levers as the window slides in opposite directions thereby to positively operate the guides by movements of the window.

3. The combination of a door having a window slidable up and down therein and operating means therefor with window guiding means and operating means therefor comprising, a channelled guide pivoted to said door for swinging movements between guiding and non-guiding position, a lever pivoted to said door for swinging movements, connections between the non-pivoted end of said lever and guide whereby the latter is actuated by the former, an actuating member fixed to said window having a part adapted to act on the end of said lever as the window slides in opposite directions thereby to positively operate the guide by movements of the window.

4. The combination of a door having a window slidable up and down therein and operating means therefor with window guiding means and operating means therefor comprising, channelled guides pivoted to said door for swinging movements between guiding and non-guiding positions, levers pivoted to said door for swinging movements, connections between the non-pivoted ends of said levers and guides whereby the latter are actuated by the former, an actuating member fixed to said window having parts adapted to act on the ends of said levers as the window slides thereby to positively operate the guides by movements of the window.

5. The combination of a door having a window slidable up and down therein, operating means having a movable window propelling part connected to the window during its operating movements for positively moving said window in opposite directions, a window guide pivoted to said door for swinging movements between window guiding and non-guiding positions, and means for positively swinging said guide between said positions including a member in the path of movement of said window, and connections between said guide and member, all adapted and arranged whereby said window positively operates said guide between guiding and non-guiding positions as the former is operated by the operating means.

6. The combination of a door having a window slidable up and down therein, operating means having a window propelling part permanently connected to the window during all of its operating movements for positively moving said window up and down, a channelled guide pivoted to said door for swinging movements between window guiding and non-guiding positions for receiving said window when in guiding position, guide-actuating means associated with said door and window including a movable member pivoted to said door in the path of movement of an actuator on said window, a part on said window adapted to engage said member and a connection pivotally connected to said member and guide.

7. The combination of a door having a window slidable up and down therein, operating means having a part operatively and permanently connected to the window for positively moving said window up and down, a window-guiding member pivoted to said door for swinging movements between window-guiding and non-window-guiding positions, an actuating lever for said guide member pivoted to said door, connections between said lever and said guiding member, and means associated with said window adapted for engaging said lever as the window moves in opposite directions, all adapted and arranged whereby said means positively swings said guiding member into a guiding position as the window moves upwardly from its lower position and positively swings said guiding member into a non-window-guiding position as the window moves to its lower position.

8. The combination with a door, of window mechanism including a window slidable in opposite directions and operating means for positively sliding the window in said opposite directions, window-guide mechanism including a window guide member pivoted to the door for swinging movements in opposite directions between window guiding and non-guiding positions and means for positively swinging the same, and engageable connections associated with the window mechanism and the guide mechanism adapted and arranged whereby during a part of the movements of the window in opposite directions the guide member is moved in synchronism therewith in its opposite directions.

9. The combination of a door with, a window member slidable in opposite directions up and down therein and operating means therefor having a window propelling member movable in opposite directions and operatively connected to the window member during all of its window sliding movements for positively moving said window up and down, a guide pivoted to said door for swinging movements between window guiding and non-guiding positions for receiving said window member when in its guiding position and actuating means for said guide member including an actuating member movable on said door, and engageable means connected to one of said first-named members and to said actuating member relatively disposed for inter-engagement as one of the said first-named members moves in its opposite directions whereby the said guide is moved in its opposite directions.

HINSDALE SMITH.